United States Patent
Tien et al.

(10) Patent No.: US 10,086,549 B2
(45) Date of Patent: Oct. 2, 2018

(54) PLASTIC EXTRUSION PROCESS CONTROL METHOD AND PARAMETERS ADJUSTMENT SYSTEM

(71) Applicant: INSTITUTE FOR INFORMATION INDUSTRY, Taipei (TW)

(72) Inventors: Yin-Jing Tien, Taipei (TW); Yi-Chang Chen, Taipei (TW); Cheng-Juei Yu, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 122 days.

(21) Appl. No.: 15/368,696

(22) Filed: Dec. 5, 2016

(65) Prior Publication Data

US 2018/0126624 A1     May 10, 2018

(30) Foreign Application Priority Data

Nov. 10, 2016   (TW) .............................. 105136682 A

(51) Int. Cl.
| | |
|---|---|
| G05B 13/00 | (2006.01) |
| B29C 47/92 | (2006.01) |
| G05B 19/19 | (2006.01) |

(52) U.S. Cl.
CPC .............. *B29C 47/92* (2013.01); *G05B 19/19* (2013.01); *B29C 2947/9259* (2013.01); *B29C 2947/92295* (2013.01); *G05B 2219/37446* (2013.01)

(58) Field of Classification Search
CPC ................................ B29C 47/92; G05B 19/19
See application file for complete search history.

(56) References Cited

U.S. PATENT DOCUMENTS

| | | | | |
|---|---|---|---|---|
| 2011/0276166 | A1* | 11/2011 | Atanasoff | .......... G01B 11/0625 700/104 |
| 2012/0296572 | A1* | 11/2012 | Hess | ....................... B29C 47/92 702/24 |

(Continued)

FOREIGN PATENT DOCUMENTS

| | | |
|---|---|---|
| TW | 450885 B | 8/2001 |
| TW | 201615844 A | 5/2016 |

OTHER PUBLICATIONS

The office action of the corresponding Taiwan application dated May 15, 2017.

(Continued)

*Primary Examiner* — Vincent Tran
(74) *Attorney, Agent, or Firm* — CKC & Partners Co., Ltd.

(57) ABSTRACT

A plastic extrusion process control method includes: receiving a plurality of historical process data of a plastic extrusion process from a database, in which each of the historical process data includes a plurality of critical parameters and a plurality of quality value; dividing each of the critical parameters into a plurality of levels; grouping the historical process data according to the levels of the critical parameters to obtain a plurality of parameter sets; calculating a quality indicator of each of the parameter sets to build an empirical response surface according to the historical process data corresponding to the parameter sets; and configuring the critical parameters of the plastic extrusion process to an automatic manufacturing system according to the empirical response surface, such that the automatic manufacturing system performs the plastic extrusion process according to the critical parameters.

15 Claims, 5 Drawing Sheets

(56) References Cited

U.S. PATENT DOCUMENTS

| | | | |
|---|---|---|---|
| 2013/0069792 A1* | 3/2013 | Blevins .................. | G05B 17/02 340/815.4 |
| 2014/0107828 A1* | 4/2014 | Zhu .................... | G01R 31/2831 700/121 |
| 2014/0222376 A1* | 8/2014 | Kao ................. | G05B 19/41875 702/182 |

OTHER PUBLICATIONS

Wen-Chin Chen, et al., Optimization of the plastic injection molding process using the Taguchi method, RSM, and hybrid Ga—PSO, The International Journal of Advanced Manufacturing Technology, Apr. 2016, p. 1873-1886, vol. 83, Issue 9, Springer-Verlag, London, UK (Original Article first online: Aug. 21, 2015).

* cited by examiner

PLASTIC EXTRUSION PROCESS CONTROL METHOD AND PARAMETERS ADJUSTMENT SYSTEM

RELATED APPLICATIONS

This application claims priority to Taiwan Application Serial Number 105136682, filed Nov. 10, 2016, which is herein incorporated by reference.

BACKGROUND

Technical Field

The present disclosure relates to a manufacturing process parameters adjustment system, and in particular, to a plastic extrusion process parameters adjustment system and process control method.

Description of Related Art

In the current technology, as the continuous manufacturing process in the plastic extrusion molding, issues such as product quality is affected and the production cost is raised occurs due to the unstable extrusion output caused by the fact that the feeding, the extrusion torques, and the states of the plastic material are easily varied during the manufacturing process. Furthermore, there are many configuration parameters in the plastic extrusion process, and a lots of experiments are required when configuring the parameters for the tuning, which causes difficulties to achieve the optimization of the parameters.

SUMMARY

One aspect of the present disclosure is a plastic extrusion process control method. The plastic extrusion process control method includes: receiving a plurality of historical process data of a plastic extrusion process from a database, in which each of the historical process data includes a plurality of critical parameters and a plurality of quality values; dividing each of the critical parameters into a plurality of levels; grouping the historical process data according to the levels of the critical parameters to obtain a plurality of parameter sets; calculating a quality indicator of each of the parameter sets to build an empirical response surface according to the historical process data corresponding to the parameter sets; and configuring the critical parameters of the plastic extrusion process to an automatic manufacturing system according to the empirical response surface, such that the automatic manufacturing system performs the plastic extrusion process according to the critical parameters.

Another aspect of the present disclosure is a parameters adjustment system for a plastic extrusion process. The parameters adjustment system includes a storage device arranged and configured to store a database and a computer executable command, in which the database is configured to store a plurality of historical process data of the plastic extrusion process, and each of the historical process data includes a plurality of critical parameters and a plurality of quality values; and a processor electrically coupled to the storage device and arranged and configured to execute the computer executable command to perform a plastic extrusion process control method, in which the plastic extrusion process control method includes: receiving the historical process data from the database; dividing each of the critical parameters into a plurality of levels; grouping the historical process data according to the levels of the critical parameters to obtain a plurality of parameter sets; calculating a quality indicator of each of the parameter sets to build an empirical response surface according to the historical process data corresponding to the parameter sets; and configuring the critical parameters of the plastic extrusion process to an automatic manufacturing system according to the empirical response surface, such that the automatic manufacturing system performs the plastic extrusion process according to the critical parameters.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
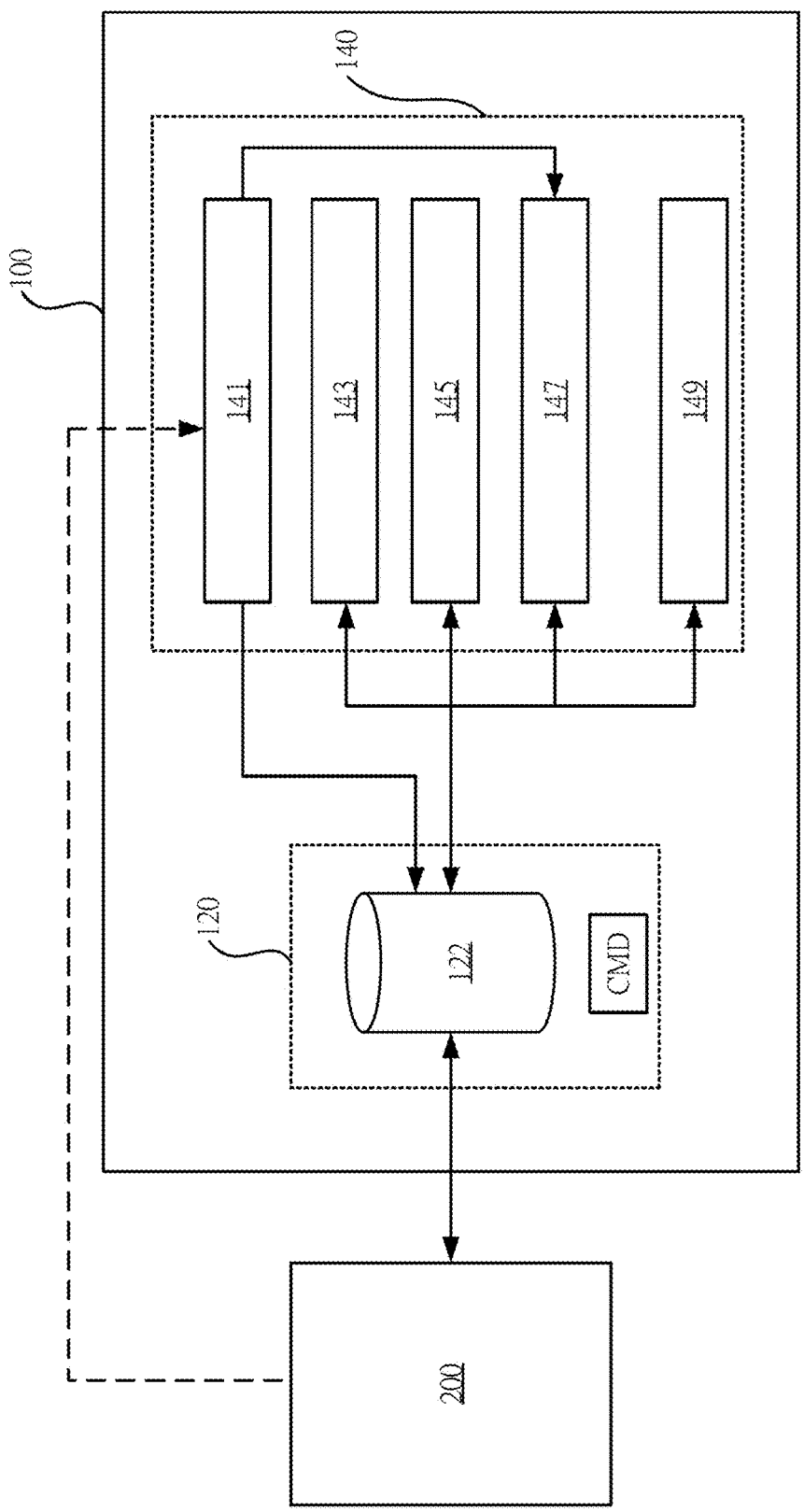
FIG. 1 is a diagram illustrating a parameters adjustment system for a plastic extrusion process according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a parameters adjustment system 100 for a plastic extrusion process according to some embodiments of the present disclosure. As shown in FIG. 1, in some embodiments, the parameters adjustment system 100 includes a storage device 120 and a processor 140.

Specifically, the storage device 120 is arranged and configured to store a database 122 and a computer executable command CMD. The database 122 is configured to store a plurality of historical process data of the plastic extrusion process. Each of the historical process data includes a plurality of critical parameters and a plurality of quality values. The ways to obtain the historical process data and related specific operation will be discussed in detail in accompanied with the drawings in the following paragraphs.

In addition, as shown in FIG. 1, in some embodiments, the storage device 120 is further configured to be coupled to the automatic manufacturing system 200, so as to configure the critical parameters in the plastic extrusion process through the database 122 in the storage device 120, such that the automatic manufacturing system 200 performs the plastic extrusion process according to the critical parameters.

In some embodiments, the processor 140 is electrically coupled to the storage device 120 and arranged and configured to execute the computer executable command CMD to perform a plastic extrusion process control method. Specifically, the configuration, the monitoring, and the adjustment of the critical parameters in the plastic extrusion process are achieved by the cooperation of the data collecting module 141, the critical parameters determining module 143, the empirical response surface module 145, the real-time monitoring module 147, and dynamic adjusting module 149 in the processor 140 when the processor 140 performs the plastic extrusion process control method according to the computer executable command CMD.

Accordingly, the processor 140 may store the configured critical parameters, and the models and data required in the configuration and adjustment of the critical parameters in the database 122, so as to perform the parameters adjustment through the database 122 to the automatic manufacturing system 200. For the convenience of the explanation, in the following paragraphs, the steps of the plastic extrusion process control method performed by the processor 140 using the data collecting module 141, the critical parameters determining module 143, the empirical response surface module 145, the real-time monitoring module 147, and dynamic adjusting module 149 will be explained in detail with the embodiments and accompanied drawings.

Figure 2:
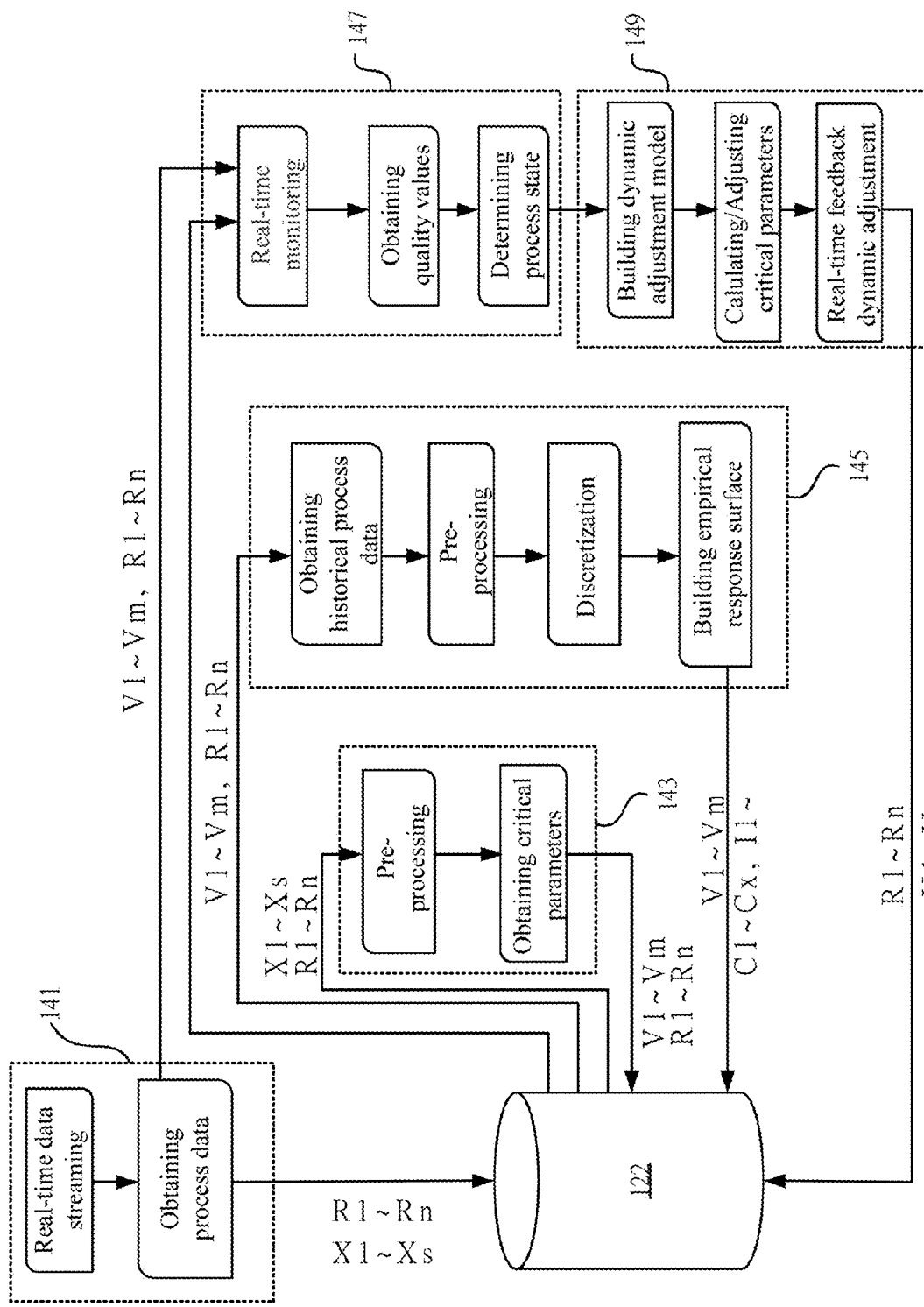
FIG. 2 is a diagram illustrating the process of the parameters adjustment system according to some embodiments of the present disclosure.
Figure 3:
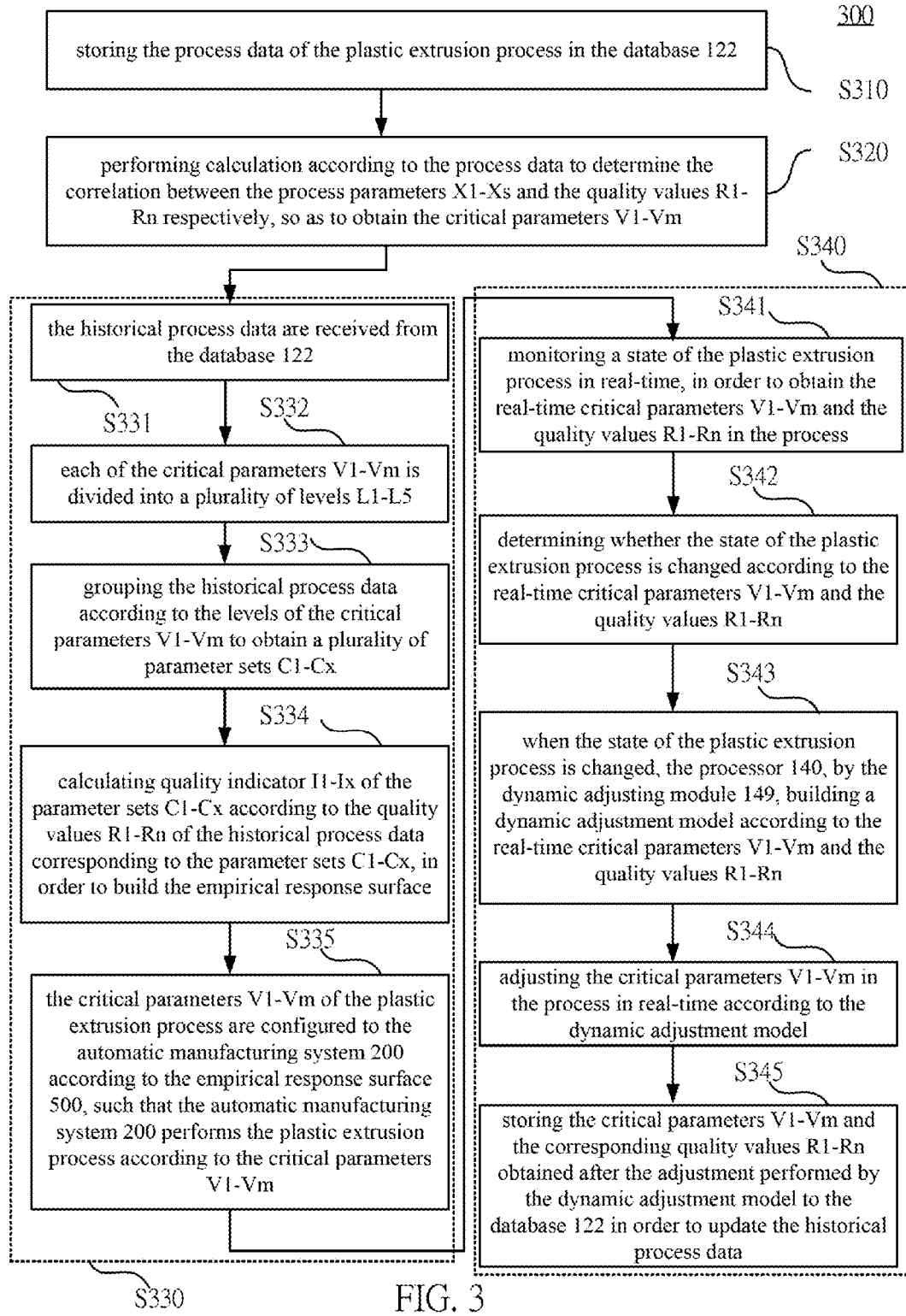
FIG. 3 is a flowchart illustrating the plastic extrusion process control method according to some embodiments of the present disclosure.

Reference is made to FIG. 2 and FIG. 3 together. FIG. 2 is a diagram illustrating the process of the parameters adjustment system 100 according to some embodiments of the present disclosure. FIG. 3 is a flowchart illustrating the plastic extrusion process control method 300 according to some embodiments of the present disclosure. In FIG. 2, like elements related to the embodiment of FIG. 1 are assigned with the same reference numerals for better understanding, and for the sake of brevity, further explanation is omitted if its operation is already discussed in detail in above paragraph. In addition, for better understanding and clarity of the explanation of the present disclosure, the plastic extrusion process control method 300 shown in FIG. 3 is discussed in relation to the parameters adjustment system 100 shown in FIG. 1 and FIG. 2, but is not limited thereto. It will be apparent to those skilled in the art that various modifications and variations can be made without departing from the scope or spirit of the disclosure.

As shown in FIG. 3, in some embodiment, the plastic extrusion process control method 300 includes steps S310, S320, S330 and S340.

First, in the step S310, the processor 140, by the data collecting module 141, stores the process data of the plastic extrusion process in the database 122, in which the process data includes a plurality of process parameters X1-Xs and quality values R1-Rn. For example, the process parameters X1-Xs may include parameters which may be obtained from the automatic manufacturing system 200 during the plastic extrusion process such as feed rates, extrusion torques, states of the plastic material, rotation speeds . . . etc. The quality values R1-Rn may include numbers which may be used to indicate the production quality of the plastic extrusion process such as weights, production rates, yield rates . . . etc.

As shown in FIG. 2, specifically, the data collecting module 141 may receive data from the external via real-time data streaming. In some embodiments, the data collecting module 141 may calculate the process states of each of the product quality, so as to obtain the process parameters X1-Xs and the quality values R1-Rn. Accordingly, the data collecting module 141 may store the process parameters X1-Xs and the quality values R1-Rn in the database 122.

Next, in the step S320, the processor 140, by the critical parameters determining module 143, performs calculation according to the process data (i.e., the process parameters X1-Xs and the quality values R1-Rn) to determine the correlation between the process parameters X1-Xs and the quality values R1-Rn respectively, so as to obtain the critical parameters V1-Vm.

As shown in FIG. 2, specifically, in some embodiments, the critical parameters determining module 143 may first perform required data preprocessing to the process parameters X1-Xs and the quality values R1-Rn. Next, the critical parameters determining module 143 may apply various correlation analysis statistical methods to determine the correlation between the process parameters X1-Xs and the quality values R1-Rn, so as to choose the parameters which are related to or having significant impact to the production quality as the critical parameters V1-Vm. Accordingly, the critical parameters determining module 143 may store the obtained critical parameters V1-Vm in the database 122 as the historical process data.

Next, in the step S330, the processor 140, by the empirical response surface module 145, builds an empirical response surface, and configures the critical parameters in the plastic extrusion process according to the empirical response surface. Specifically, in some embodiments, the step S330 further includes steps S331, S332, S333, S334 and S335.

First, in step S331, by the empirical response surface module 145, the historical process data (i.e., the critical parameters V1-Vm and the quality values R1-Rn) are received from the database 122.

Figure 4:
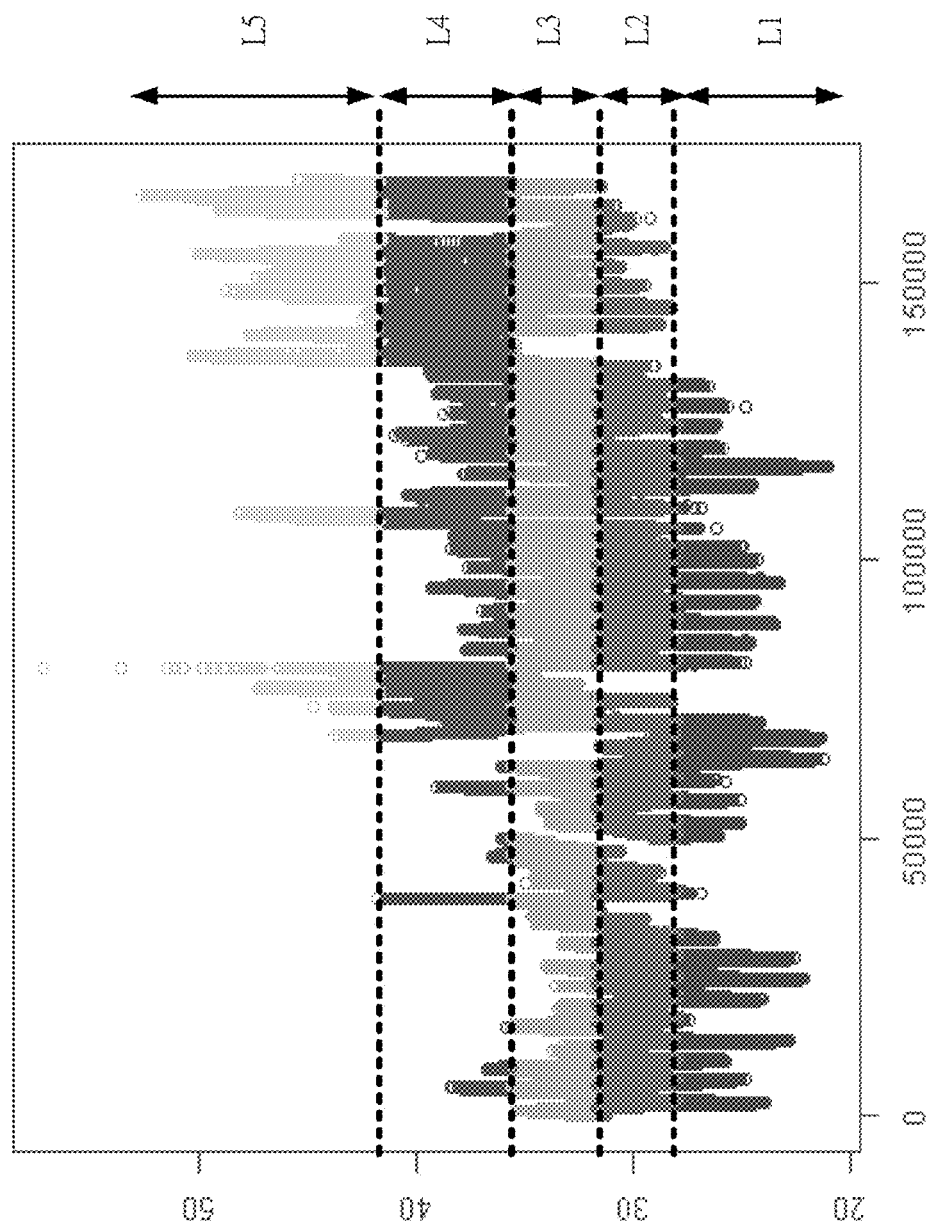
FIG. 4 is a diagram illustrating the discretization process from parameters to levels according to some embodiments of the present disclosure.

Next, in step S332, by the empirical response surface module 145, each of the critical parameters V1-Vm is divided into a plurality of levels L1-L5. Reference is made to FIG. 4. FIG. 4 is a diagram illustrating the discretization process from parameters to levels according to some embodiments of the present disclosure. In FIG. 4, the x-axis indicates time, the y-axis indicates one of the critical parameters V1-Vm, for example, the rotation speed of the feeding machine. As shown in FIG. 4, at different time, the rotation speed of the feeding machine is operated at different interval. Since the rotation speed of the feeding machine is continuous data, the empirical response surface module 145 performs the discretization process to divide the rotation speed of the feeding machine into five levels L1-L5 from low speed to high speed correspondingly, in order to build the empirical response surface with the latter operation.

Specifically, the parameter discretization to divide each of the critical parameters V1-Vm into multiple levels in the step S332 may be achieved by various ways. For example, in some embodiments, the empirical response surface module 145 may apply methods such as K-means, Partitioning around medoids (PAM), or Model-Based Cluster, but the present disclosure is not limited thereto and one skilled in the art may apply various ways to realize the parameter discretization.

Next, in the step S333, the processor 140, by the empirical response surface module 145, groups the historical process data according to the levels of the critical parameters V1-Vm to obtain a plurality of parameter sets C1-Cx. Each of the parameter sets C1-Cx indicates a possible combination of the discretized critical parameters V1-Vm.

Next, in the step S334, the processor 140, by the empirical response surface module 145, calculates a corresponding quality indicator I1-Ix of each of the parameter sets C1-Cx according to the quality values R1-Rn of the historical process data corresponding to the parameter sets C1-Cx, in order to build the empirical response surface.

Figure 5:
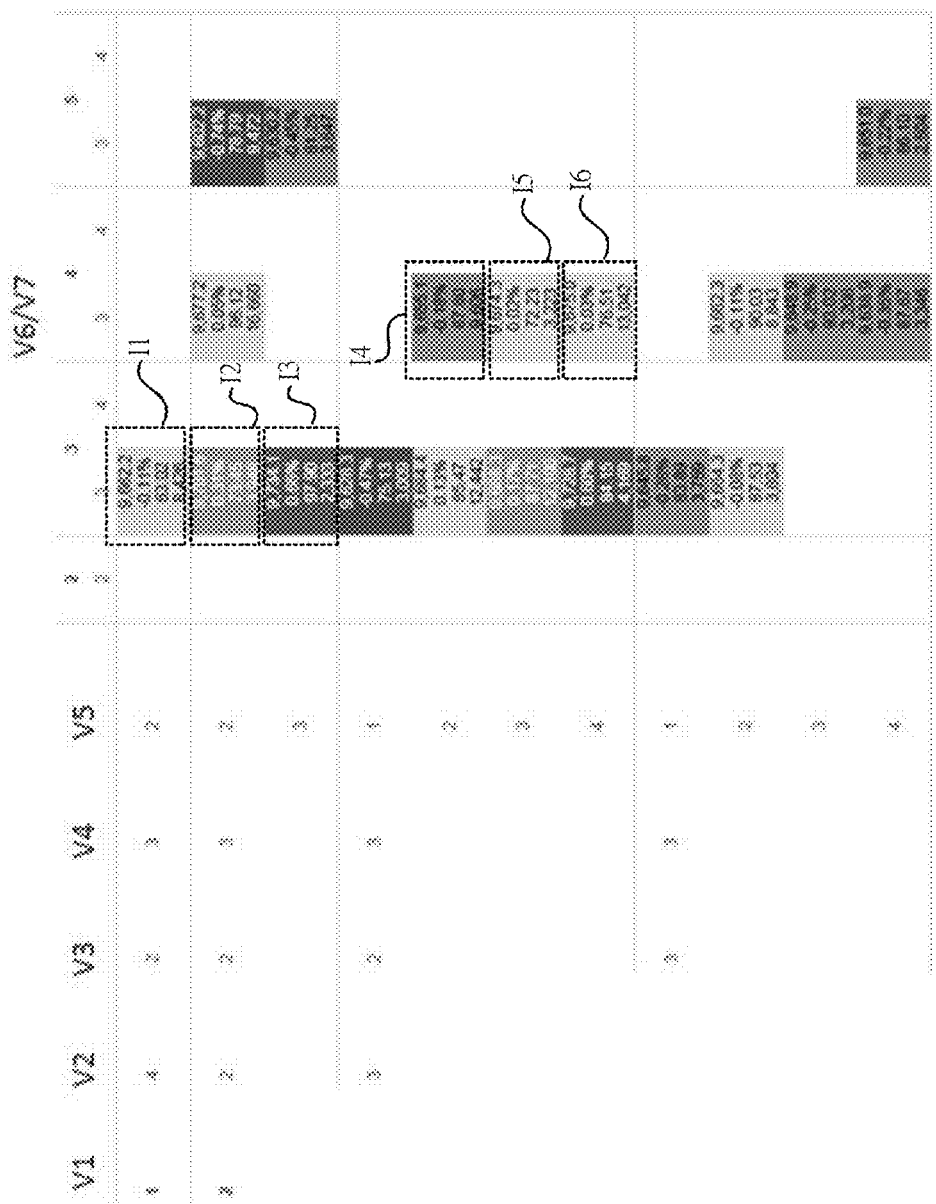
FIG. 5 is a diagram illustrating an empirical response surface according to some embodiments of the present disclosure.

For the ease of the explanation, reference is made to FIG. 5 in combination. FIG. 5 is a diagram illustrating an empirical response surface 500 according to some embodiments of the present disclosure. As shown in FIG. 5, after the discretization, the critical parameters V1-Vm may be divided into multiple levels. For the parameter sets C1-Cx obtained by grouping the historical process data based on the levels of the critical parameters V1-Vm, the empirical response surface module 145 may calculate corresponding quality indicators I1-Ix accordingly.

For example, the quality indicator I1 in the empirical response surface 500 responds to the parameter sets C1, in which the critical parameters V1-V7 are respectively in the levels L1, L4, L2, L3, L2, L3, L3. Similarly, the quality indicator I2 responds to the parameter sets C2, in which the critical parameters V1-V7 are respectively in the levels L2, L2, L2, L3, L2, L3, L3; the quality indicator I3 responds to the parameter sets C3, in which the critical parameters V1-V7 are respectively in the levels L2, L2, L2, L3, L3, L3, L3; the quality indicator I4 responds to the parameter sets C4, in which the critical parameters V1-V7 are respectively in the levels L2, L3, L2, L3, L2, L4, L3; the quality indicator I5 responds to the parameter sets C5, in which the critical parameters V1-V7 are respectively in the levels L2, L3, L2, L3, L3, L4, L3; the quality indicator I6 responds to the parameter sets C6, in which the critical parameters V1-V7 are respectively in the levels L2, L3, L2, L3, L4, L4, L3, and so on.

As shown in FIG. 5, in some embodiments, each of the quality indicators I1-Ix may actually include multiple quality factors. For example, the quality factors may include average weight, the decline rate, the variance value, and the amount and so on. Each of the quality indicators may be obtained by applying various calculation functions to the quality values R1-Rn of the historical data in the corresponding parameter set C1-Cx. For example, the empirical response surface module 145 may count the historical data in the database 122, which meet the criteria of the specific parameter set (e.g., parameter set C1), and calculate the information such as average weight, the decline rate, the variance value, and the amount under the process using parameter set C1 according to those historical data meeting the criteria, in order to obtain corresponding quality indicator I1. Similarly, other quality indicators I2-Ix may also be calculated by similar method and further explanation is omitted herein for the sake of brevity.

It is noted that, the empirical response surface 500 shown in FIG. 5 is only one possible exemplary illustration way and not meant to limit the present disclosure. Those skilled in the art may also apply various formats to represent the empirical response surface 500 including the relationship between multiple dimension data.

After the empirical response surface 500 is built, the empirical response surface module 145 may also obtain the impact of different critical parameters V1-Vm to the process quality via the quality indicators I1-Ix corresponding to the different parameter sets C1-Cx. Accordingly, in the step S335, the critical parameters V1-Vm of the plastic extrusion process are configured to the automatic manufacturing system 200 according to the empirical response surface 500, such that the automatic manufacturing system 200 performs the plastic extrusion process according to the critical parameters V1-Vm. Therefore, the critical parameters V1-Vm may be chosen based on the actual needs in order to control the production quality of the plastic extrusion process to meet the actual requirements. In addition, the empirical response surface module 145 may also store the parameter sets C1-Cx shown in the empirical response surface 500 and the corresponding quality indicators I1-Ix to the database 122 for the use of other modules.

As shown in FIG. 2, by the aforementioned steps S331-S335, the processor 140, by the empirical response surface module 145, builds the empirical response surface, and configures the critical parameters V1-Vm in the plastic extrusion process according to the empirical response surface. It is noted that, as shown in FIG. 2, the empirical response surface module 145 may first perform required data preprocessing to the received historical process data, for the convenience of the latter operation of the parameter discretization and the construction of the empirical response surface.

Next, in the step S340, the processor 140, by the real-time monitoring module 147 and the dynamic adjusting module 149, monitors and adjusts the critical parameters V1-Vm in the plastic extrusion process in real-time. In some embodiments, the step S340 further includes steps S341, S342, S343, S344, and S345.

First, in the step S341, the processor 140, by the real-time monitoring module 147, monitors a state of the plastic extrusion process in real-time, in order to obtain the real-time critical parameters V1-Vm and the quality values R1-Rn in the process.

Next, in the step S342, the processor 140, by the real-time monitoring module 147, determines whether the state of the plastic extrusion process is changed according to the real-time critical parameters V1-Vm and the quality values R1-Rn.

Specifically, in some embodiments, the processor 140, by the real-time monitoring module 147, obtains an error value according to the real-time quality values R1-Rn. Then, the processor 140, by the real-time monitoring module 147, determines the state of the plastic extrusion process is changed when the sum of the error values sampled in a time period is larger than a predetermined value. Accordingly, the processor 140 may activate the warning correspondingly when the state of the plastic extrusion process is changed, and perform the latter dynamic adjustments of the parameters. The method to determine whether the state of the plastic extrusion process is changed may be denoted by the following equation:

$$\text{Cusum}_T = \Sigma_{t=1}^{T}(y_t - \mu_0)$$

Where $y_t$ denotes the sampled value at time t, $\mu_0$ denotes the target value, $(y_t - \mu_0)$ denotes one error value in a single sampling, and $\text{Cusum}_T$ denotes the accumulated error value. Thus, when the error value $\text{Cusum}_T$ in one time period T is larger than the predetermined value, the state of the plastic extrusion process is determined that has been changed.

Next, in the step S343, when the state of the plastic extrusion process is changed, the processor 140, by the dynamic adjusting module 149, builds a dynamic adjustment model according to the real-time critical parameters V1-Vm and the quality values R1-Rn. Specifically, in some embodiments, the dynamic adjustment model may be denoted by the following equation:

$$Y_t = X_t \beta_t + Z_t \delta_t$$

Where the dynamic adjusting module 149 divides the critical parameters V1-Vm to a plurality of controllable critical parameters, which are controllable during the process, and a plurality of non-controllable critical parameters, which are not controllable during the process. $Y_t$ in the equation denotes the change of the quality values, $X_t$ in the equation denotes the non-controllable critical parameters, $Z_t$ in the equation denotes the controllable critical parameters, $\delta_t$ in the equation denotes the controllable parameter regression coefficient corresponding to the controllable critical parameters, and $\beta_t$ in the equation denotes the non-controllable parameter regression coefficient corresponding to the non-controllable critical parameters.

Alternatively stated, in the step S343, the processor 140, by the dynamic adjusting module 149, may first obtaining the controllable parameter regression coefficient $\delta_t$ corresponding to the controllable critical parameters and the non-controllable parameter regression coefficient $\beta_t$ corresponding to the non-controllable critical parameters by regression calculation according to the real-time controllable critical parameters, the non-controllable critical parameters, and the quality values R1-Rn.

The processor 140, by the dynamic adjusting module 149, may then obtain the dynamic adjustment model of the controllable critical parameters $Z_t$, the non-controllable critical parameters $X_t$, and the quality values $Y_t$ according to the controllable parameter regression coefficient $\delta_t$ and the non-controllable parameter regression coefficient $\beta_t$.

When the dynamic adjustment model is built, in the step S344, the processor 140, by the dynamic adjusting module 149, may adjust the critical parameters V1-Vm in the process in real-time according to the dynamic adjustment model. Specifically, in some embodiments, in the step S344, the processor 140, by the dynamic adjusting module 149, adjusts one or more controllable critical parameters during the process according to the dynamic adjustment model and the non-controllable critical parameters, so as to control the state of the process to ensure the quality of the product.

Next, in the step S345, the processor 140 stores the critical parameters V1-Vm and the corresponding quality values R1-Rn obtained after the adjustment performed by the dynamic adjustment model to the database 122 in order to update the historical process data. Therefore, as the monitoring and adjustment during the manufacturing process, the historical process data in the database 122 may be further added and updated. Thus, the processor 140 may perform step S331-S335 again periodically and update the empirical response surface 500 according to the new historical process data by the empirical response surface module 145, and then configure the critical parameters V1-Vm in the plastic extrusion process according to the updated empirical response surface 500, so as to further optimize the configuration of the process parameters.

Therefore, as shown in FIG. 2, through the above steps S341-S345, the processor 140, by the real-time monitoring module 147 and the dynamic adjusting module 149, monitors and adjusts the critical parameters V1-Vm in the plastic extrusion process in real-time to ensure the stability of the product quality during the manufacturing process.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

It is noted that, the features disclosed in the various drawings, embodiments, and the features of the different embodiments may be combined with each other if no contradiction occurs. The embodiments illustrated in the drawings are merely examples and may be simplified for the simplicity of the explanation and the ease of understanding, and thus are not meant to limit the present disclosure.

In summary, by the above operations, the parameters adjustment system 100 may, by the empirical response surface module 145, apply the actual production historical process data in the past for correlation analysis to find the critical parameters V1-Vm, and then discretize the critical parameters V1-Vm to multiple levels L1-L5, and build the empirical response surface 500 by calculating the quality data for the level combination of each parameters, so as to bring out the optimized production parameters configuration for the requirements and the product to be produced. Thus, the issue that too many parameter for configuration in the plastic extrusion process and difficulties for optimization can be solved.

In addition, in some embodiments, the parameters adjustment system 100 may, by the real-time monitoring module 147, monitors the quality and the key critical parameters, and identifies the process state by the statistical quality control method. When the process state is changed, the parameters adjustment system 100 may, by the dynamic adjusting module 149, further build the dynamic adjustment model in real-time according to the current parameters and calculate corresponding adjusting value for the feedback control, so as to ensure the stability of the product quality. Thus, the problem that the product quality is affected by the unstable extrusion output due to the variation of the feeding, the extrusion torques, and the states of the plastic material during the continuous manufacturing process in the plastic extrusion molding can be solved.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A plastic extrusion process control method, comprising:
   receiving a plurality of historical process data of a plastic extrusion process from a database, wherein each of the historical process data comprises a plurality of critical parameters and a plurality of quality values;
   dividing each of the critical parameters into a plurality of levels;
   grouping the historical process data according to the levels of the critical parameters to obtain a plurality of parameter sets;
   calculating a quality indicator of each of the parameter sets to build an empirical response surface according to the historical process data corresponding to the parameter sets; and
   configuring the critical parameters of the plastic extrusion process to an automatic manufacturing system according to the empirical response surface, such that the automatic manufacturing system performs the plastic extrusion process according to the critical parameters.

2. The plastic extrusion process control method of claim 1, further comprising:
   monitoring a state of the plastic extrusion process in real-time in order to obtain the real-time critical parameters and quality values in the process;
   determining whether the state of the plastic extrusion process is changed according to the real-time critical parameters and quality values;
   when the state of the plastic extrusion process is changed, building a dynamic adjustment model according to the real-time critical parameters and quality values; and
   adjusting the critical parameters in the process in real-time according to the dynamic adjustment model.

3. The plastic extrusion process control method of claim 2, further comprising:
   storing the critical parameters and the corresponding quality values obtained after the adjustment performed by the dynamic adjustment model to the database in order to update the historical process data.

4. The plastic extrusion process control method of claim 2, wherein the critical parameters comprises a plurality of controllable critical parameters and a plurality of non-controllable critical parameters, and the step of building the dynamic adjustment model comprises:
   obtaining a controllable parameter regression coefficient corresponding to the controllable critical parameters and a non-controllable parameter regression coefficient corresponding to the non-controllable critical parameters by regression calculation according to the real-time controllable critical parameters, the non-controllable critical parameters, and the quality values; and
   obtaining the dynamic adjustment model of the controllable critical parameters, the non-controllable critical parameters, and the quality values according to the controllable parameter regression coefficient and the non-controllable parameter regression coefficient.

5. The plastic extrusion process control method of claim 4, wherein the step of adjusting the critical parameters in the process in real-time comprises:
   adjusting the controllable critical parameters according to the dynamic adjustment model and the non-controllable critical parameters so as to control the state of the plastic extrusion process.

6. The plastic extrusion process control method of claim 2, wherein the step of determining whether the state of the plastic extrusion process is changed comprises:
   obtaining an error value according to the real-time quality values; and
   determining the state of the plastic extrusion process is changed when the sum of the error values sampled in a time period is larger than a predetermined value.

7. The plastic extrusion process control method of claim 1, further comprising:
   storing a process data of the plastic extrusion process in the database, wherein the process data comprises a plurality of process parameters and the quality values; and
   performing calculation according to the process data to determine the correlation between the process parameters and the quality values respectively, so as to obtain the critical parameters and store the critical parameters in the database as the historical process data.

8. A parameters adjustment system for a plastic extrusion process, comprising:
   a storage device arranged and configured to store a database and a computer executable command, wherein the database is configured to store a plurality of historical process data of the plastic extrusion process, and each of the historical process data comprises a plurality of critical parameters and a plurality of quality values; and
   a processor electrically coupled to the storage device and arranged and configured to execute the computer executable command to perform a plastic extrusion process control method, wherein the plastic extrusion process control method comprises:
   receiving the historical process data from the database;
   dividing each of the critical parameters into a plurality of levels;
   grouping the historical process data according to the levels of the critical parameters to obtain a plurality of parameter sets;
   calculating a quality indicator of each of the parameter sets to build an empirical response surface according to the historical process data corresponding to the parameter sets; and
   configuring the critical parameters of the plastic extrusion process to an automatic manufacturing system according to the empirical response surface, such that the automatic manufacturing system performs the plastic extrusion process according to the critical parameters.

9. The parameters adjustment system of claim 8, wherein the plastic extrusion process control method performed by the processor further comprises:
   monitoring a state of the plastic extrusion process in real-time in order to obtain the real-time critical parameters and quality values in the process;
   determining whether the state of the plastic extrusion process is changed according to the real-time critical parameters and quality values;

when the state of the plastic extrusion process is changed, building a dynamic adjustment model according to the real-time critical parameters and quality values; and adjusting the critical parameters in the process in real-time according to the dynamic adjustment model.

10. The parameters adjustment system of claim 9, wherein the plastic extrusion process control method performed by the processor further comprises:

storing the critical parameters and the corresponding quality values obtained after the adjustment performed by the dynamic adjustment model to the database in order to update the historical process data.

11. The parameters adjustment system of claim 9, wherein the critical parameters comprises a plurality of controllable critical parameters and a plurality of non-controllable critical parameters, and the step of building the dynamic adjustment model performed by the processor comprises:

obtaining a controllable parameter regression coefficient corresponding to the controllable critical parameters and a non-controllable parameter regression coefficient corresponding to the non-controllable critical parameters by regression calculation according to the real-time controllable critical parameters, the non-controllable critical parameters, and the quality values; and obtaining the dynamic adjustment model of the controllable critical parameters, the non-controllable critical parameters, and the quality values according to the controllable parameter regression coefficient and the non-controllable parameter regression coefficient.

12. The parameters adjustment system of claim 11, wherein the step of adjusting the critical parameters in the process in real-time performed by the processor comprises:

adjusting the controllable critical parameters according to the dynamic adjustment model and the non-controllable critical parameters so as to control the state of the plastic extrusion process.

13. The parameters adjustment system of claim 9, wherein the step of determining whether the state of the plastic extrusion process is changed performed by the processor comprises:

obtaining an error value according to the real-time quality values; and determining the state of the plastic extrusion process is changed when the sum of the error values sampled in a time period is larger than a predetermined value.

14. The parameters adjustment system of claim 8, wherein the plastic extrusion process control method performed by the processor further comprises:

storing a process data of the plastic extrusion process in the database, wherein the process data comprises a plurality of process parameters and the quality values; and performing calculation according to the process data to determine the correlation between the process parameters and the quality values respectively, so as to obtain the critical parameters and store the critical parameters in the database as the historical process data.

15. The parameters adjustment system of claim 8, wherein the storage device is further configured to be coupled to the automatic manufacturing system, so as to configure the critical parameters in the plastic extrusion process through the database in the storage device.

* * * * *